United States Patent
Ito

(10) Patent No.: US 10,649,235 B2
(45) Date of Patent: May 12, 2020

(54) OPTICAL ELEMENT AND OPTICAL APPARATUS

(71) Applicant: CANON KABUSHIKI KAISHA, Tokyo (JP)

(72) Inventor: Satoshi Ito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 415 days.

(21) Appl. No.: 15/370,243

(22) Filed: Dec. 6, 2016

(65) Prior Publication Data

US 2017/0168372 A1   Jun. 15, 2017

(30) Foreign Application Priority Data

Dec. 15, 2015   (JP) .................................. 2015-244490

(51) Int. Cl.
| | |
|---|---|
| *G02C 7/08* | (2006.01) |
| *G02F 1/1343* | (2006.01) |
| *G02F 1/29* | (2006.01) |
| *G02F 1/137* | (2006.01) |

(52) U.S. Cl.
CPC ............ *G02C 7/083* (2013.01); *G02F 1/137* (2013.01); *G02F 1/13439* (2013.01); *G02F 1/292* (2013.01); *G02C 2202/20* (2013.01); *G02F 2001/294* (2013.01)

(58) Field of Classification Search
CPC .............. G02C 7/083; G02F 2001/294; G02F 1/13439; G02F 1/1343; G02F 1/13471; G02F 2203/28; A61B 1/0019
See application file for complete search history.

(56) References Cited

U.S. PATENT DOCUMENTS

| | | | |
|---|---|---|---|
| 7,352,514 B2 | 4/2008 | Hendriks et al. | |
| 7,599,128 B2 | 10/2009 | Shimozono et al. | |
| 7,728,949 B2 | 6/2010 | Clarke et al. | |
| 2006/0164732 A1* | 7/2006 | Lee ........................ | G02B 3/14 359/676 |
| 2007/0146490 A1* | 6/2007 | Hendriks ................ | G02B 3/14 348/208.12 |
| 2008/0055536 A1* | 3/2008 | Shimozono ....... | G02F 1/133526 349/200 |

(Continued)

FOREIGN PATENT DOCUMENTS

| | | |
|---|---|---|
| JP | 2005505789 A | 2/2005 |
| JP | 2007518133 A | 7/2007 |
| JP | 2008003576 A | 1/2008 |

(Continued)

OTHER PUBLICATIONS

Office Action issued in Japanese Appln. No. 2015-244490 dated Oct. 1, 2019. English translation provided.

*Primary Examiner* — Michael H Caley
*Assistant Examiner* — Jonathan Y Jung
(74) *Attorney, Agent, or Firm* — Rossi, Kimms & McDowell LLP

(57) ABSTRACT

An optical element switchable to a first state and a second state includes a first material and a second material, each of optical properties of the first and second materials changes between the first state and the second state, and refractive indices of the first and second materials and Abbe's numbers of the first and second materials satisfy a predetermined relationship.

17 Claims, 6 Drawing Sheets

(56) References Cited

U.S. PATENT DOCUMENTS

2014/0043672 A1* 2/2014 Clarke ................... G02C 7/083
                                                    359/315
2016/0070125 A1* 3/2016 Reich ..................... G02F 1/132
                                                    348/164

FOREIGN PATENT DOCUMENTS

| JP | 2013137544 A | 7/2013 |
| WO | 2006115147 A1 | 11/2006 |
| WO | 2008142846 A1 | 11/2008 |

* cited by examiner

OPTICAL ELEMENT AND OPTICAL APPARATUS

BACKGROUND OF THE INVENTION

Field of the Invention

The present invention relates to a liquid crystal diffraction lens.

Description of the Related Art

At the present day, there are glasses using a fixed focal length lens, a bifocal progressive lens, a double focus lens, or the like, as reading glasses that are generally distributed. For regular elderly persons, aged eyes are resolved as long as the reading glasses including the fixed focal length lens is used only when focusing on a near point such as reading. On the other hand, irregular elderly persons need to use glasses including the bifocal progressive lens or the double focus lens that is adjusted to focus on a far point such as an infinite distance and that is partially modified for the aged eyes.

However, in the glasses using the bifocal progressive lens or the double focus lens, there are regions which have different optical powers (focal lengths) in the lens, and accordingly a view is distorted when seeing the far distance or a defocused area occurs to be blurred. The double focus lens has a shape where a small lens of the presbyopia power unit is added to a part of a lens, and accordingly the appearance of the glasses is not good.

Japanese Patent Laid-open No. 2013-137544 discloses glasses using an electro-active element (liquid crystal diffraction lens) that is provided with a presbyopia power unit which can set a variable power to apply power only for seeing a close range such as a reading distance while not applying power for seeing a far distance such as an infinite distance.

However, the liquid crystal diffraction lens disclosed in Japanese Patent Laid-open No. 2013-137544 uses the combination of a liquid crystal material with low refractive index and low dispersion and a substrate with high refractive index and high dispersion to sandwich a diffraction surface in an electro-active state, and accordingly it is difficult to achieve a high diffraction efficiency over a wide wavelength band.

SUMMARY OF THE INVENTION

The present invention provides an optical element and an optical apparatus having a high diffraction efficiency over a wide wavelength band.

An optical element as one aspect of the present invention is an optical element switchable to a first state and a second state including a first material and a second material, each of optical properties of the first and second materials changes between the first state and the second state, and refractive indices of the first and second materials and Abbe's numbers of the first and second materials satisfy a predetermined relationship.

An optical apparatus as another aspect of the present invention includes the optical element and a controller configured to set the optical element to be in the first state or the second state.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 8:
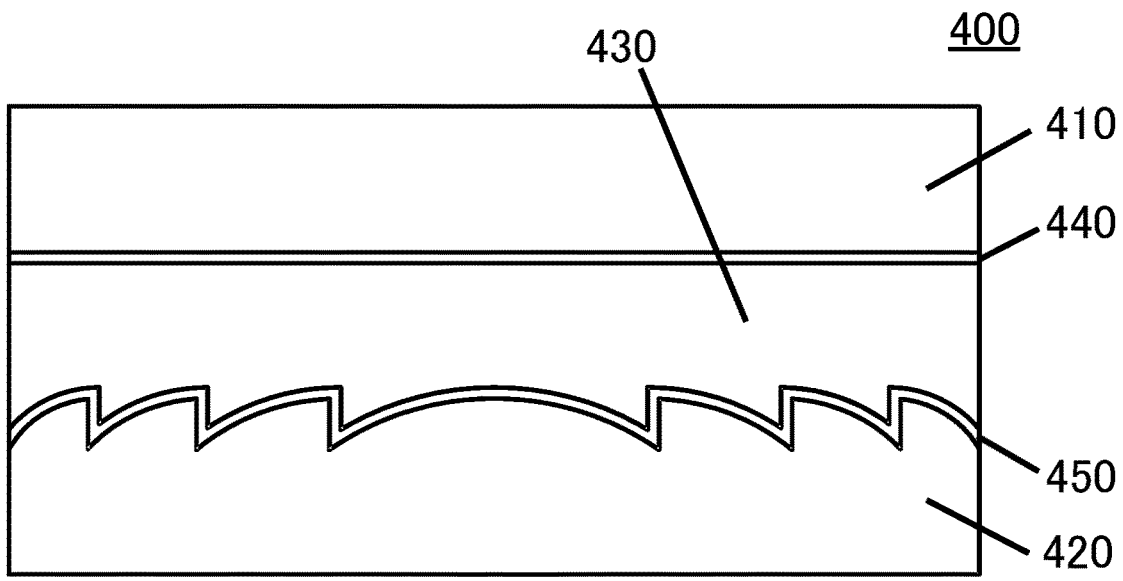
FIG. 8 is a configuration diagram of an optical element as a comparative example.

First of all, referring to FIGS. 8 to 10, an optical element (liquid crystal diffraction lens or electro-active lens) as a comparative example will be described. FIG. 8 is a configuration diagram (cross-sectional view) of a liquid crystal diffraction lens 400 as a comparative example. The liquid crystal diffraction lens 400 includes a substrate 410 that has an approximately-flat surface, a substrate 420 having a relief surface, and a liquid crystal material 430 provided between the substrate 410 and the substrate 420. The relief surface means a surface having a fine relief shape (rugged shape or concavo-convex shape) whose height (height) is around a wavelength of light. Surfaces of the two substrates 410 and 420 facing the liquid crystal material 430 are coated with optically-transparent single electrodes 440 and 450, respectively.

Figure 9:
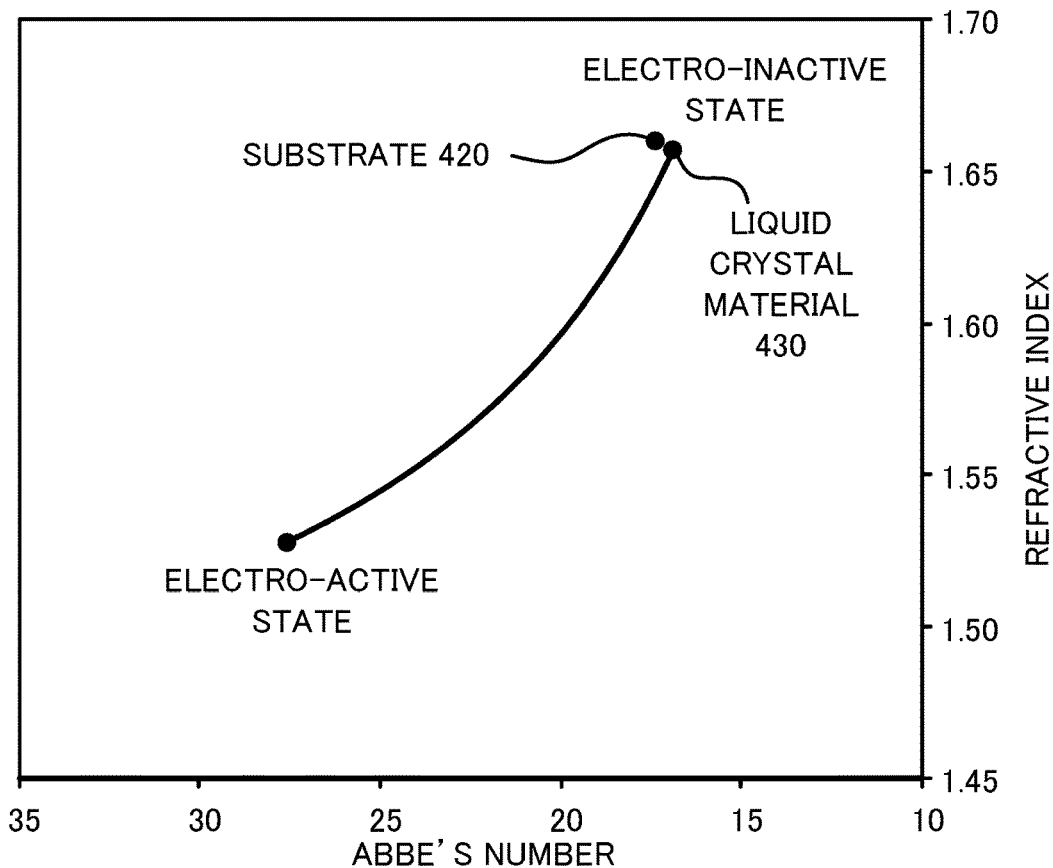
FIG. 9 is a refractive index and Abbe's number of each material constituting the optical element as the comparative example.

FIG. 9 is the refractive index and the Abbe's number of the materials (the substrate 420 and the liquid crystal material 430) constituting the optical element as the comparative example. As illustrated in FIG. 9, the refractive index and the Abbe's number of the substrate 420 are set to approximately coincide with the refractive index and the Abbe's number of the liquid crystal material 430 in the electro-inactive state, and on the other hand the refractive index of the liquid crystal material 430 is changed to generate power in the electro-active state. However, the liquid crystal diffraction lens of this configuration is constituted by the combination of the liquid crystal material with low refractive index and low dispersion and the substrate with high refractive index and high dispersion to sandwich a diffraction surface in the electro-active state, and accordingly it is difficult to obtain a high diffraction efficiency over a wide wavelength band. In this embodiment, the diffraction efficiency is defined as a ratio of a light beam propagating in each diffraction direction with respect to an incident light beam.

Figure 10:
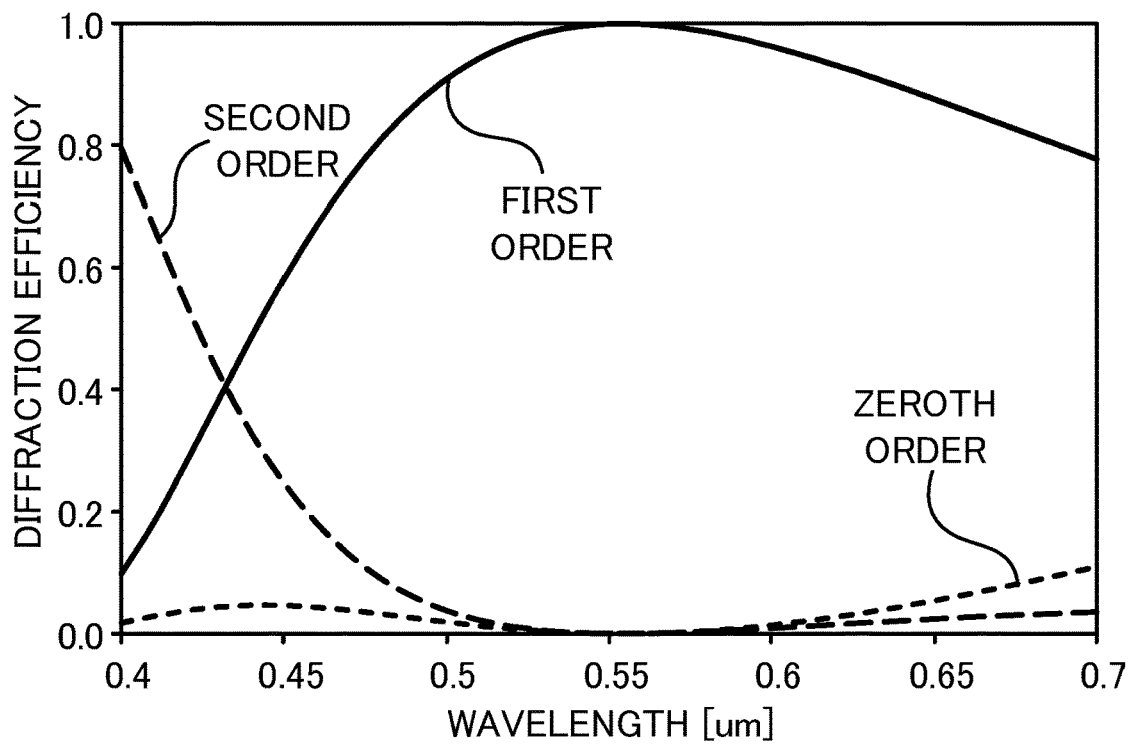
FIG. 10 is a diffraction efficiency of the optical element as the comparative example.

FIG. 10 is a diffraction efficiency of the optical element (liquid crystal diffraction lens 400) as the comparative example. While the diffraction efficiency of first-order light as a design order is high with respect to the wavelength of 550 nm as a design wavelength, it is decreased with respect to the wavelength distant from the design wavelength and especially it is greatly decreased with respect to the short wavelength band. The light corresponding to the decrease of the diffraction efficiency of the design order light becomes light with other diffraction orders. Light other than the design order light becomes flare light which decreases contrast. Accordingly, when the liquid crystal diffraction lens 400 is used in reading or the like, the flare caused by unnecessary diffracted light (zeroth-order light or second-order light) becomes prominent and the visibility of characters is decreased, and thus it is not preferable.

The optical element (liquid crystal diffraction lens or electro-active lens) of this embodiment is switchable between at least two optical states (first state and second state). In other words, each of optical properties of the first and second electro-active materials changes between the first state and the second state. The optical state means optical power (focal length) of the electro-active lens, and the electro-active lens has power that varies between the electro-inactive state (first state) and the electro-active state (second state). As a representative example, while it does not substantially have power in the electro-inactive state, it has desired power (for example +3D) in the electro-active state. By using such an electro-active lens in reading glasses (optical apparatus), it is possible to apply power to a presbyopia power unit only for seeing a close range (near distance) such as a reading distance, while not to apply power to the presbyopia power unit for seeing a far distance such as an infinite distance.

Figure 1:
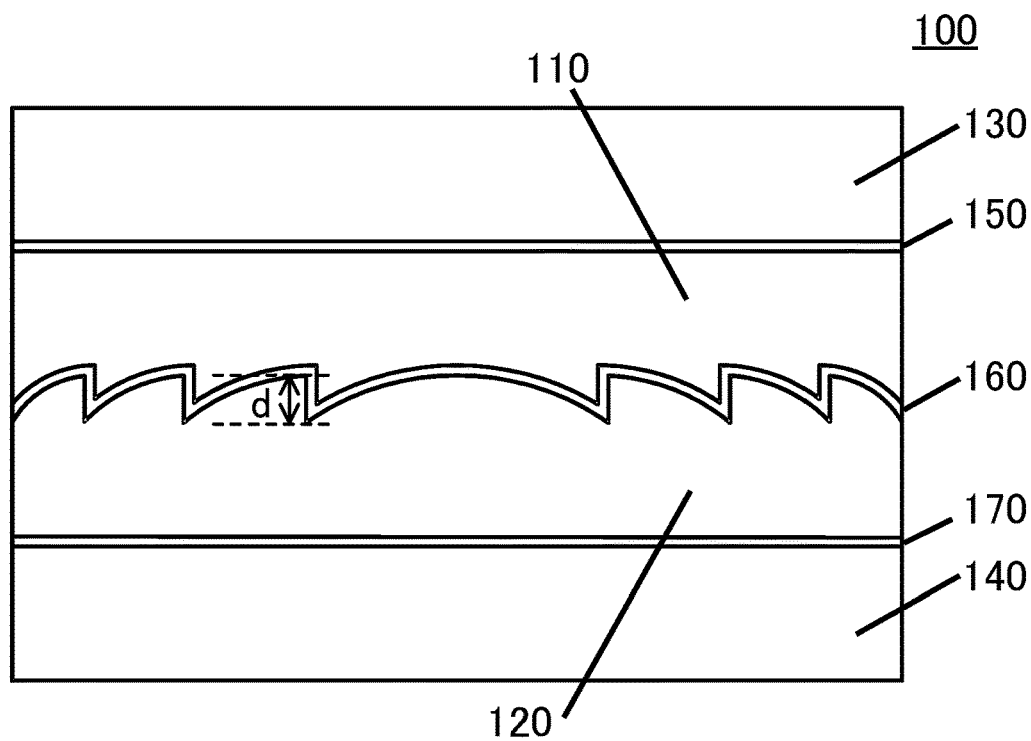
FIG. 1 is a configuration diagram of an optical element in this embodiment.

Next, referring to FIGS. 1 to 3, an optical element (electro-active lens) in this embodiment will be described. The optical element of this embodiment is a liquid crystal diffraction lens having a variable focusing function. FIG. 1 is a configuration diagram (cross-sectional view) of the optical element (electro-active lens 100) in this embodiment.

The electro-active lens 100 includes a first electro-active material 110 (first material or liquid crystal material) having a first refractive index and first Abbe's number and a second electro-active material 120 (second material or liquid crystal material) having a second refractive index and second Abbe's number. At least one of surfaces of each of the first electro-active material 110 and the second electro-active material 120 is a relief surface. Furthermore, the electro-active lens 100 includes a pair of substrates 130 and 140 provided to sandwich the first electro-active material 110 and the second electro-active material 120 to hold the first electro-active material 110 and the second electro-active material 120.

The electro-active lens 100 includes optically-transparent electrodes 150, 160, and 170 that are provided close to the first electro-active material 110 or the second electro-active material 120. Each of the optically-transparent electrodes 150, 160, and 170 is constituted by for example ITO. The electrodes 150 and 170 are a pair of first transparent electrodes that are provided to sandwich the first electro-active material 110 and the second electro-active material 120. The substrates 130 and 140 are a pair of substrates that are provided to sandwich the pair of first transparent electrodes. The electrode 160 is a second transparent electrode that is provided between the first electro-active material 110 and the second electro-active material 120.

An alignment film (oriented film) may be provided on a surface contacting the corresponding electro-active material of surfaces of each of the electrodes 150, 160, and 170, and according to this configuration, the orientation of the electro-active material can be controlled. The electrodes 150, 160, and 170 applies a predetermined voltage to each of the first electro-active material 110 and the second electro-active material 120 to change the refractive index and the Abbe's number of each of the first electro-active material 110 and the second electro-active material 120 to desired values. As described above, each of the first electro-active material 110 and the second electro-active material 120 varies depending on the applied voltage between in the electro-inactive state and the electro-active state.

In order to maximize the diffraction efficiency with respect to the normal incidence (i.e., incidence in a vertical direction in FIG. 1) in the electro-active state, an optical path length difference between a peak and a valley of a relief surface (i.e., height of a relief shape) may be set to be an integral multiple of a wavelength. In this case, expression (1) below is satisfied.

$$(n2(\lambda 0) - n1(\lambda 0))d = m\lambda 0 \quad (1)$$

In expression (1), symbol $\lambda 0$ denotes a design wavelength, symbol d denotes a height of the relief shape, symbols $n1(\lambda)$ and $n2(\lambda)$ denote refractive indices of the first electro-active material 110 and the second electro-active material 120, respectively, with respect to a wavelength $\lambda$ in the electro-active state, and m denotes a diffraction order. An m-th order diffraction efficiency $\eta$ with respect to another wavelength $\lambda$ that does not satisfy expression (1) is represented as expression (2) below.

$$\eta(\lambda) = [\sin\{\pi(\varphi(\lambda) - m)\}/\{\pi(\varphi(\lambda) - m)\}]^2 \quad (2)$$

In expression (2), $\varphi(\lambda) = (n2(\lambda) - n1(\lambda))d/\lambda$ is satisfied. If expression (1) is satisfied with respect to an entire wavelength $\lambda$, the wavelength dependence of the diffraction efficiency $\eta$ is resolved. When the design value is set to m=1 and expression (1) is satisfied with respect to each of d, C, and F lines, expression (3) below is derived.

$$(n2(\lambda d) - n1(\lambda d))/\{(n2(\lambda F) - n2(\lambda C)) - (n1(\lambda F) - n1(\lambda C))\} = \lambda d/(\lambda F - \lambda C) \quad (3)$$

In expression (3), symbols $\lambda d$, $\lambda C$, and $\lambda F$ denote wavelengths of the d, C, and F lines, respectively. According to expression (3), in order to achieve a high diffraction efficiency over a wide wavelength band, it can be understood that the electro-active lens needs to be constituted by the combination of a material with high refractive index and low dispersion and a material with low refractive index and high dispersion. Therefore, in this embodiment, the refractive indices n1 and n2 of the first electro-active material 110 and the second electro-active material 120, respectively, in the electro-active state satisfy expression (4) below.

$$n1 < n2 \quad (4)$$

Furthermore, in this embodiment, the Abbe's numbers $\nu 1$ and $\nu 2$ of the first electro-active material 110 and the second electro-active material 120, respectively, in the electro-active state satisfy expression (5) below.

$$\nu 1 < \nu 2 \quad (5)$$

In expression (4), each of the refractive indices n1 and n2 indicates a value with respect to the d line. In expression (5), each of the Abbe's numbers $\nu 1$ and $\nu 2$ is Abbe's number with respect to the d line as a reference wavelength.

Figure 2:
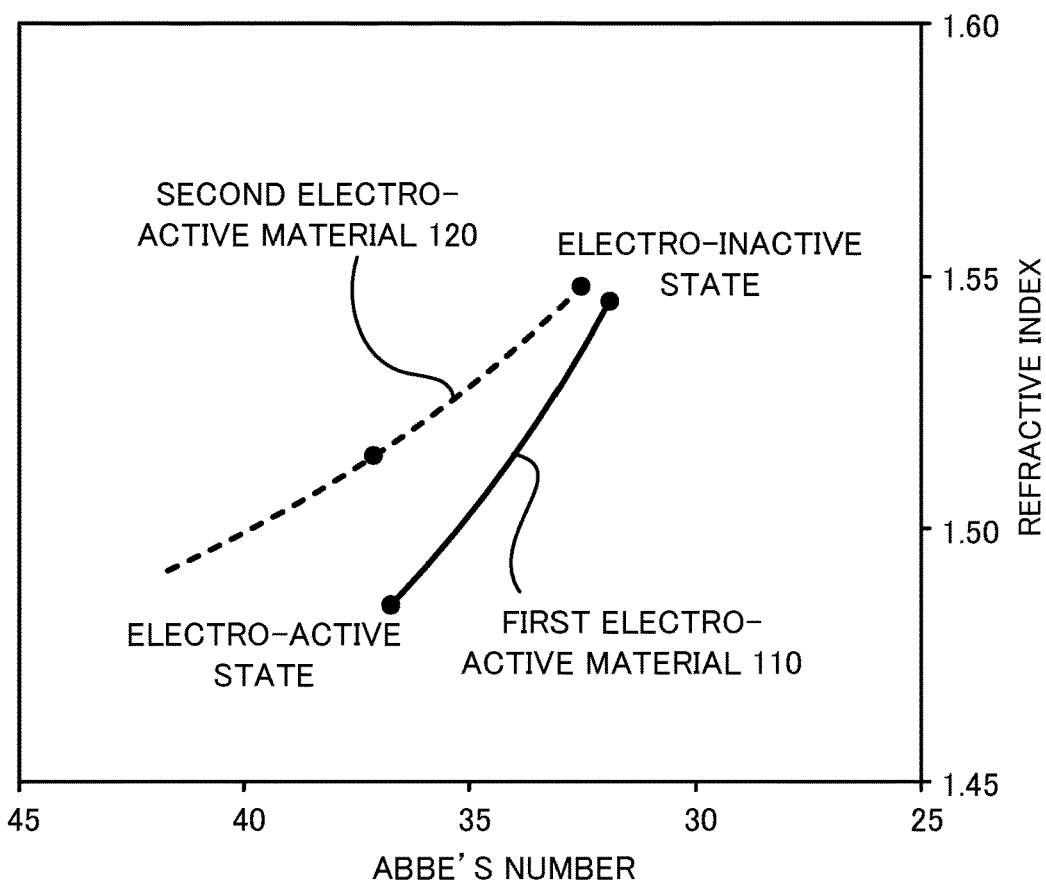
FIG. 2 is a refractive index and Abbe's number of each material constituting the optical element in this embodiment.

FIG. 2 is the refractive index and the Abbe's number of each material (each of the first electro-active material 110 and the second electro-active material 120) constituting the electro-active lens 100. In FIG. 2, a solid line corresponds to the first electro-active material 110, and a dashed line corresponds to the second electro-active material 120. The refractive index and the Abbe's number of the first electro-active material 110 are set to approximately coincide with the refractive index and the Abbe's number of the second electro-active material 120, respectively, in the electro-inactive state, and on the other hand the refractive index of each of the electro-active materials are changed to generate power in the electro-active state.

In the electro-active lens 100, each of the refractive index and the Abbe's number of the first electro-active material 110 varies between in the electro-inactive state (first state) and the electro-active state (second state). Similarly, each of the refractive index and the Abbe's number of the second electro-active material 120 varies between in the electro-inactive state and the electro-active state. In this embodiment, when the electro-inactive state is changed to the electro-active state, the refractive index n1 and the Abbe's number ν1 of the first electro-active material 110 are changed to be n1=1.485 and ν1=36.73, respectively, in the electro-active state. Similarly, the refractive index n2 and the Abbe's number ν2 of the second electro-active material 120 are changed to be n2=1.515 and ν2=37.12, respectively, in the electro-active state. According to this configuration, in the electro-active state, the electro-active lens 100 is constituted by the combination of a material with high refractive index and low dispersion and a material with low refractive index and high dispersion, and thus a high diffraction efficiency can be achieved over a wide wavelength band.

Figure 3:
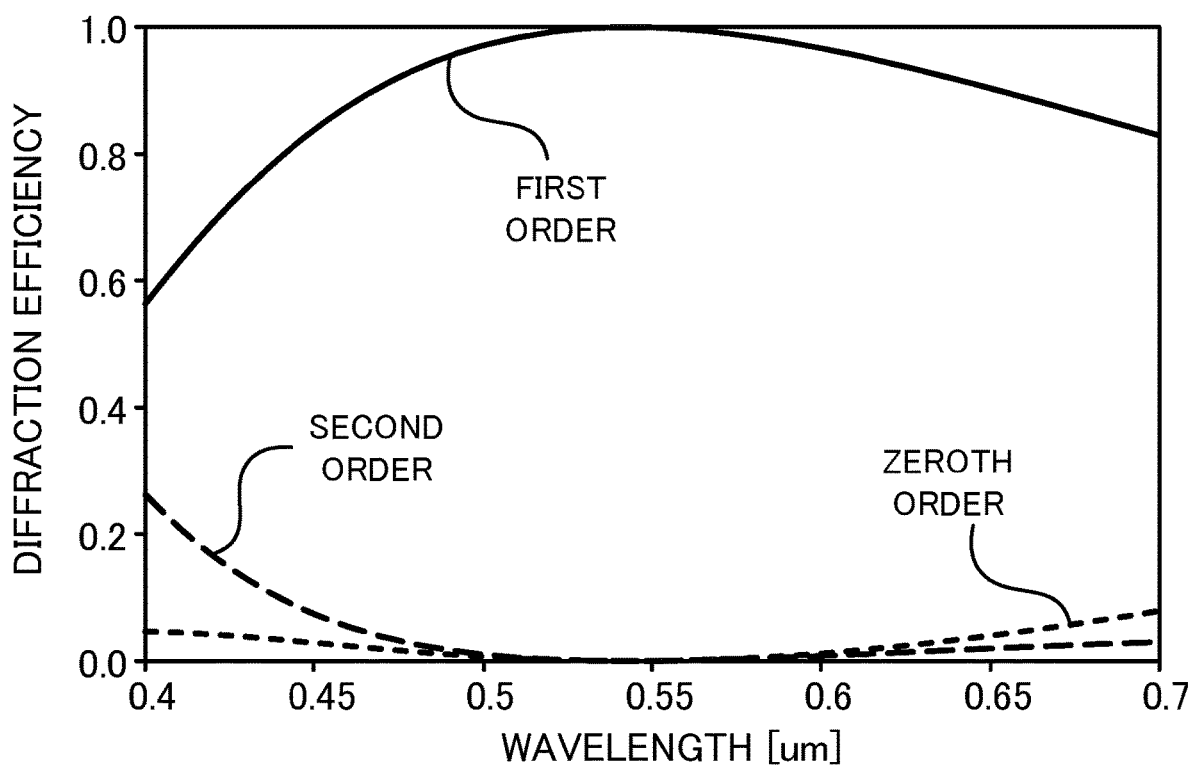
FIG. 3 is a diffraction efficiency of the optical element in this embodiment.

FIG. 3 is the diffraction efficiency of the electro-active lens 100. As is clear from FIG. 3, the diffraction efficiency of first-order light with a short wavelength and a long wavelength is improved compared to that of the liquid crystal diffraction lens 400 (see FIG. 10) as a comparative example, and especially the diffraction efficiency of the light with the short wavelength is greatly improved. Accordingly, a flare caused by unnecessary diffracted light (zeroth-order light or second-order light) can be reduced and it is possible to improve visibility.

In the electro-active lens 100, it is preferred that the first electro-active material 110 and the second electro-active material 120 satisfy expression (6) below.

$$\Delta n1/\Delta \nu 1 < \Delta n2/\Delta \nu 2 \qquad (6)$$

In expression (6), symbols Δn1 and Δn2 denote variations (change amounts) of the refractive indices n1 and n2, respectively, when the electro-inactive state is changed to the electro-active state. Symbols Δν1 and Δν2 denote variations (change amounts) of the Abbe's numbers ν1 and ν2 when the electro-inactive state is changed to the electro-active state.

A ratio Δn/Δν of the variation Δn (variation Δn1 or Δn2) of the refractive index and the variation Δν (variation Δν1 or Δν2) of the Abbe's number represents an inclination of a variation curve on the n-ν diagram of illustrating the relationship between the refractive index and the Abbe's number of the electro-active material. In this embodiment, the first electro-active material 110 is constituted by a material having the inclination of the variation curve of Δn1/Δν1=−0.012. The second electro-active material 120 is constituted by a material having the inclination of the variation curve of Δn2/Δν2=−0.007. According to this configuration, in the electro-active state, the electro-active lens 100 is constituted by the combination of a material with high refractive index and low dispersion and a material with low refractive index and high dispersion, and thus a high diffraction efficiency can be achieved over a wide wavelength band.

In the electro-active lens 100, it is preferred that each of the first electro-active material 110 and the second electro-active material 120 has a birefringence index not less than 0.08. A uniaxial optical material such as a liquid crystal has an ordinary light refractive index no and an extraordinary light refractive index ne, and the birefringence index is defined as a difference (ne−no) of the two refractive indices. In this embodiment, the first electro-active material 110 is constituted by a material having the ordinary light refractive index no and the extraordinary light refractive index ne of no=1.485 and ne=1.605, respectively. The second electro-active material 120 is constituted by a material having the ordinary light refractive index no and the extraordinary light refractive index ne of no=1.492 and ne=1.604, respectively.

In this case, the birefringence indices of the first electro-active material 110 and the second electro-active material 120 are 0.120 and 0.112, respectively. Thus, by using the electro-active material having the birefringence index not less than 0.08, a dynamic range of the change of the refractive index in accordance with the change from the electro-inactive state to the electro-active state can be widened, and it is possible to easily control the refractive index in the electro-active state.

In the electro-active lens 100, it is preferred that the refractive indices n1 and n2 in the electro-active state satisfy expression (7) below.

$$0.006 < (n2-n1) < 0.06 \qquad (7)$$

In order to maximize the diffraction efficiency with respect to the normal incidence in the electro-active state, an optical path length difference between a peak and a valley of a relief surface (i.e., height d of the relief shape) needs to be an integral multiple of a wavelength λ. A human visual system does not uniformly respond to light with entire wavelength of the visible light spectrum. While the human visual system indicates a great response at the vicinity of the center of the visible light spectrum, its response is decreased with respect to red and blue wavelengths at both ends. Since the peak of the response in the light-adapted condition is around 550 nm, typically the design wavelength is set to be 550 nm. When the design value is 550 nm and the design diffraction order is first order, according to expression (1), (n2−n1)=550 nm/d is obtained.

As described above, if a value (i.e., difference between the refractive indices n1 and n2) exceeds the upper limit of expression (7), the height d of the relief shape is too low and it is difficult to fabricate the relief shape, and accordingly it is not preferable. The relief shape can be formed by using a lot of technologies including machine processing, transferring by a mold, and etching, and ideally it is preferred that the height of the relief shape is 10 to 100 μm. On the other hand, if the value exceeds the lower limit of expression (7), the difference of the refractive indices is too small and it is difficult to add the power by diffraction, and accordingly it is not preferable.

In the electro-active lens 100, it is preferred that the first electro-active material 110 and the second electro-active material 120 satisfy expression (8) below.

$$(\Delta n1/\Delta \nu 1)/(\Delta n2/\Delta \nu 2) > 1.5 \qquad (8)$$

A ratio Δn/Δν of the variation Δn of the refractive index and the variation Δν of the Abbe's number represents an inclination of a variation curve on the n-ν diagram of illustrating the relationship between the refractive index and the Abbe's number of the electro-active material. If a value exceeds the lower limit of expression (8), the inclinations of the variation curves of the first electro-active material 110 and the second electro-active material 120 are close to each other. In this case, it is difficult to effectively achieve the combination of a material with high refractive index and low dispersion and a material with low refractive index and high dispersion while the difference of the refractive indices of the electro-active materials in the electro-active state is ensured, and accordingly it is not preferable.

If a voltage cannot be applied to the electro-active material due to mechanical failure or power consumption, an influence of the electro-active lens on a user must be avoided. Typical reading glasses correct vision of the user to focus on a far point such as an infinite distance, and it adds power corresponding to an insufficient power of the adjustment to the presbyopia power unit when moving focus to a near point such as a reading distance. Accordingly, it is preferred that the electro-active lens has a configuration in which power is not given to the electro-active lens in the electro-inactive state where the voltage is not applied to the electro-active material and the power is added to the electro-active lens in the electro-active state where the voltage is applied to the electro-active material. According to this configuration, even in a state where the voltage cannot be applied to the electro-active material due to mechanical failure or the like, the electro-active lens is initialized to a state where it focuses on the far point and thus the influence on the user can be avoided.

In order to achieve this configuration, in the electro-active lens 100, it is preferred that a difference between the refractive indices n1 and n2 in the electro-inactive state is smaller than a difference between the refractive indices n1 and n2 in the electro-active state. Preferably, the refractive indices n1 and n2 are approximately equal to each other in the electro-inactive state. According to this configuration, in the electro-inactive state, the electro-active lens 100 does not have refractive power and thus it is possible to focus on a far point accurately.

In the electro-active lens 100, it is preferred that a difference between the Abbe's numbers ν1 and ν2 in the electro-inactive state is smaller than a difference between the Abbe's numbers ν1 and ν2 in the electro-active state. Preferably, the Abbe's numbers ν1 and ν2 in the electro-inactive state are approximately equal to each other. According to this configuration, in the electro-inactive state, the electro-active lens 100 does not have refractive power with respect to light with other wavelengths, as well as the light with design wavelength, and thus it is possible to provide the electro-active lens where a chromatic aberration is reduced.

In the electro-active lens 100, it is preferred that each of the first electro-active material 110 and the second electro-active material 120 is a cholesteric liquid crystal or a nematic liquid crystal including a chiral twist agent. The cholesteric liquid crystal, similarly to the nematic liquid crystal, is optically uniaxial and has a birefringence index. With respect to the cholesteric liquid crystal, directors of liquid crystal molecules rotate in a spiral manner in a thickness direction of a liquid crystal material. A length along a rotation axis that is required for the directors of the liquid crystal molecules to rotate by 360 degrees is called a twist pitch. With respect to a light wave that has a wavelength corresponding to the twist pitch and that propagates vertically to the directors of the liquid crystal molecules, the cholesteric liquid crystal has an average refractive index nave=(no+ne)/2. When a sufficiently high voltage is applied, the directors of the liquid crystal molecules are parallel to the applied electric field. Therefore, with respect to the light wave propagating in an electric field direction, the cholesteric liquid crystal has the ordinary light refractive index no. Consequently, the cholesteric liquid crystal changes the orientation of the liquid crystal molecules according to the strength of the applied electric field, and it has a refractive index between the average refractive index nave and the ordinary light refractive index no with respect to the light wave propagating along the rotation axis of the directors.

By adding the chiral twist agent to the nematic liquid crystal, properties similar to those of the cholesteric liquid crystal can be obtained. The nematic liquid crystal including the chiral twist agent has the ordinary light refractive index no and the extraordinary light refractive index ne which are the same as those of the original nematic liquid crystal, and it can adjust the twist pitch to a desired value by using the helical twist force of the added chiral twist agent. The average refractive index nave of each of the cholesteric liquid crystal and the nematic liquid crystal including the chiral twist agent is constant independently of a polarization state of an incident light wave, and accordingly each of the cholesteric liquid crystal and the nematic liquid crystal including the chiral twist agent has polarization insensitivity. Therefore, by using the cholesteric liquid crystal or the nematic liquid crystal including the chiral twist agent as the first electro-active material 110 or the second electro-active material 120, it is possible to add a uniform force of convergence with respect to the randomly-polarized light wave.

Figure 4:
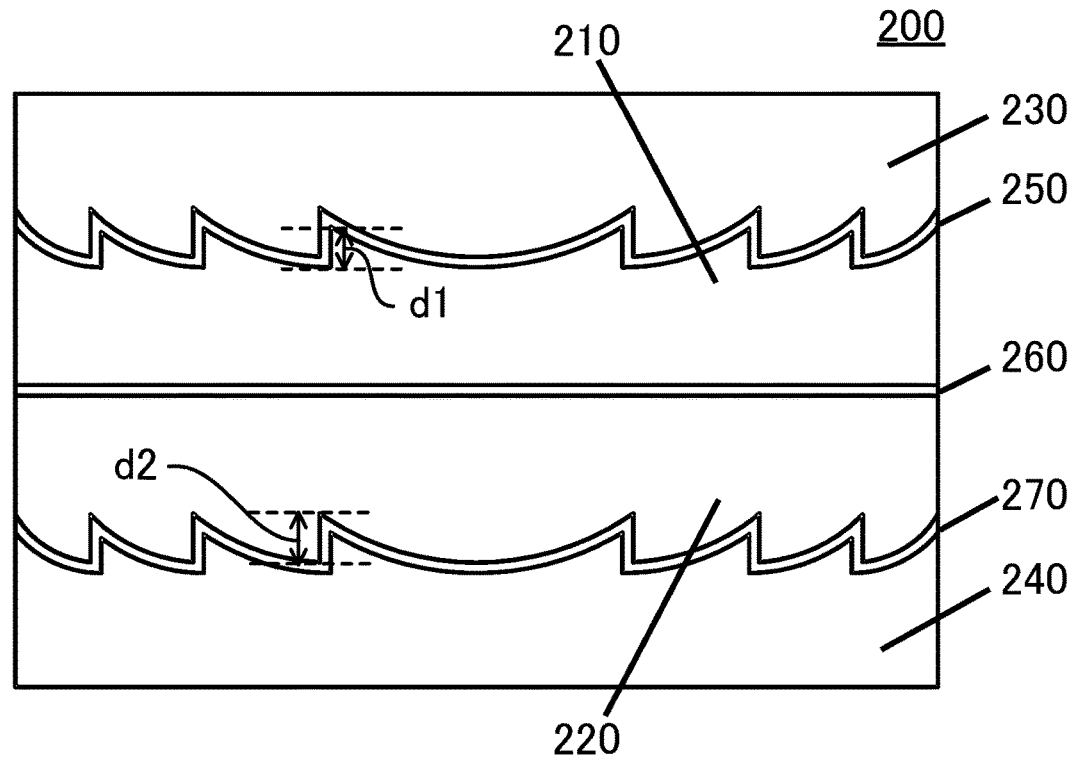
FIG. 4 is a configuration diagram of an optical element as a modification in this embodiment.

Next, referring to FIGS. 4 to 6, an optical element (electro-active lens or liquid crystal diffraction lens) as a modification in this embodiment will be described. FIG. 4 is a configuration diagram (cross-sectional view) of an optical element (electro-active lens 200) as the modification.

The electro-active lens 200 includes a first electro-active material 210 (first material) having a first refractive index and first Abbe's number and a second electro-active material 220 (second material) having a second refractive index and second Abbe's number. Furthermore, the electro-active lens 200 includes a pair of substrates 230 and 240 provided to sandwich the first electro-active material 210 and the second electro-active material 220 to hold the first electro-active material 210 and the second electro-active material 220. In the electro-active lens 200, a surface located closer to the pair of substrates (substrates 230 or 240) of the surfaces of each of the first electro-active material 210 and the second electro-active material 220 is a relief surface.

The electro-active lens 200 includes optically-transparent electrodes 250, 260, and 270 that are provided close to the first electro-active material 210 or the second electro-active material 220. Each of the optically-transparent electrodes 250, 260, and 270 is constituted by for example ITO. An alignment film may be provided on a surface contacting the corresponding electro-active material of surfaces of each of the electrodes 250, 260, and 270, and according to this configuration, the orientation of the electro-active material can be controlled. The electrodes 250, 260, and 270 apply a predetermined voltage to each of the first electro-active material 210 and the second electro-active material 220 to change the refractive index and the Abbe's number of each of the first electro-active material 210 and the second electro-active material 220 to desired values.

The electro-active lens 200 includes the substrates 230 and 240 each having one surface as a relief surface, and accordingly the relief surfaces can be easily formed. In the electro-active lens 200, a condition to maximize the diffraction efficiency at the normal incidence in the electro-active state can be represented by expression (9) below.

$$(n\mathrm{sub}(\lambda 0)-n2(\lambda 0))d2+(n1(\lambda 0)-n\mathrm{sub}(\lambda 0))d1=m\lambda 0 \quad (9)$$

In expression (9), symbol d1 denotes a height of a relief shape which is close to the substrate 230, symbol d2 denotes a height of a relief shape which is close to the substrate 240, and symbol nsub(λ0) denotes a refractive index of each of the substrates 230 and 240 with respect to a design wavelength λ0. When the heights d1 and d2 of the relief shapes coincide with each other to satisfy d1=d2=d, expression (9) can be rewritten as expression (9') below.

$$(n1(\lambda 0)-n2(\lambda 0))d=m\lambda 0 \quad (9')$$

As described above, expression (9') is identical to expression (1) when the sign of the height d of the relief shape is reversed.

Figure 5:
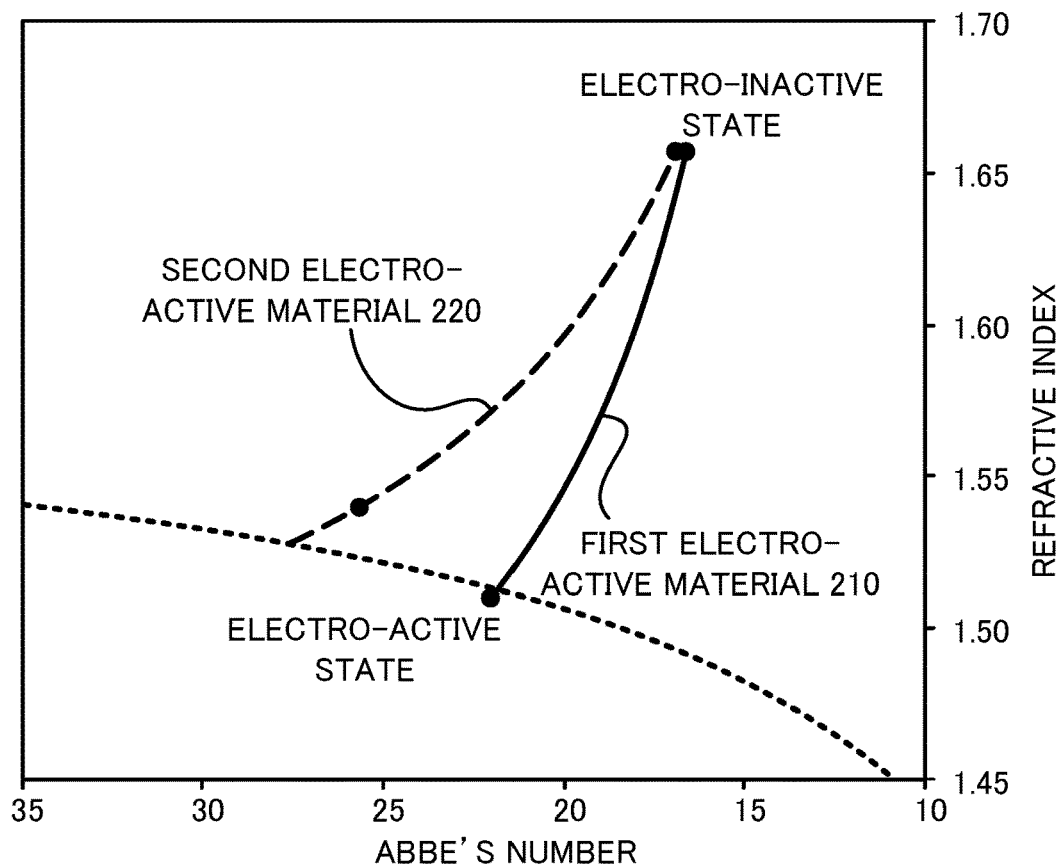
FIG. 5 is a refractive index and Abbe's number of each material constituting the optical element as the modification in this embodiment.

FIG. 5 is the refractive index and the Abbe's number of each material (each of the first electro-active material 210 and the second electro-active material 220) constituting the electro-active lens 200. In FIG. 5, a solid line corresponds to the first electro-active material 210, and a dashed line corresponds to the second electro-active material 220. A dotted line in FIG. 5 indicates an example of the combination of the electro-active materials which satisfies expression (3). The refractive index and the Abbe's number of the first electro-active material 210 are set to approximately coincide with the refractive index and the Abbe's number of the second electro-active material 220, respectively, in the electro-inactive state, and on the other hand the refractive index of each of the electro-active materials are changed to generate power in the electro-active state.

In the electro-active lens 200, the first electro-active material 210 is constituted by a liquid crystal material having ne=1.804 and no=1.510, and the second electro-active material 220 is constituted by a liquid crystal material having ne=1.786 and no=1.528. Furthermore, in the electro-active lens 200, when the electro-inactive state is changed to the electro-active state, the refractive index n1 and the Abbe's number ν1 of the first electro-active material 210 are changed to be n1=1.510 and ν1=22.00, respectively, in the electro-active state. Similarly, the refractive index n2 and the Abbe's number ν2 of the second electro-active material 220 are changed to be n2=1.540 and ν2=25.64, respectively, in the electro-active state. In this case, inclinations of the variation curves are Δn1/Δν1=−0.029 and Δn2/Δν2=−0.013. According to this configuration, in the electro-active state, the electro-active lens 200 is constituted by the combination of a material with high refractive index and low dispersion and a material with low refractive index and high dispersion, and thus a high diffraction efficiency can be achieved over a wide wavelength band.

Figure 6:
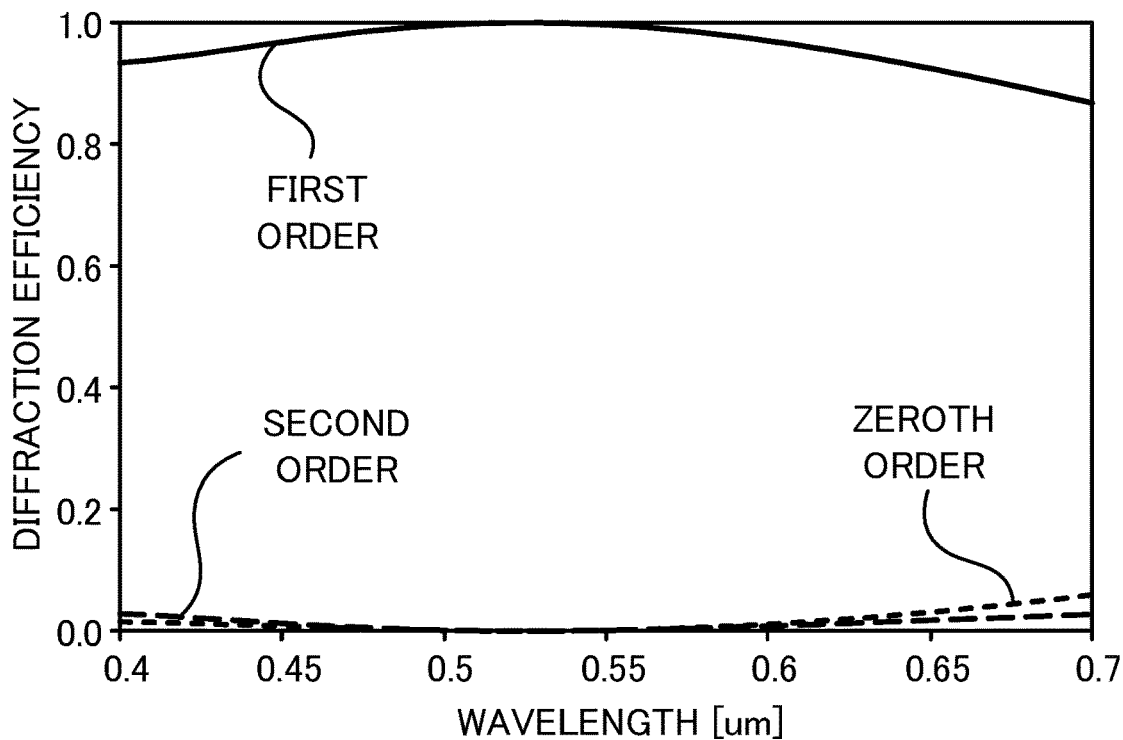
FIG. 6 is a diffraction efficiency of the optical element as the modification in this embodiment.

FIG. 6 is the diffraction efficiency of the electro-active lens 200. As is clear from FIG. 6, by adopting the configuration close to the combination satisfying expression (3), the diffraction efficiency of first-order light with a short wavelength and a long wavelength is improved compared to that of the liquid crystal diffraction lens 400 (see FIG. 10), and especially the diffraction efficiency of the light with the short wavelength is greatly improved. Accordingly, a flare caused by unnecessary diffracted light (zeroth-order light or second-order light) can be reduced and it is possible to improve visibility.

Figure 7:
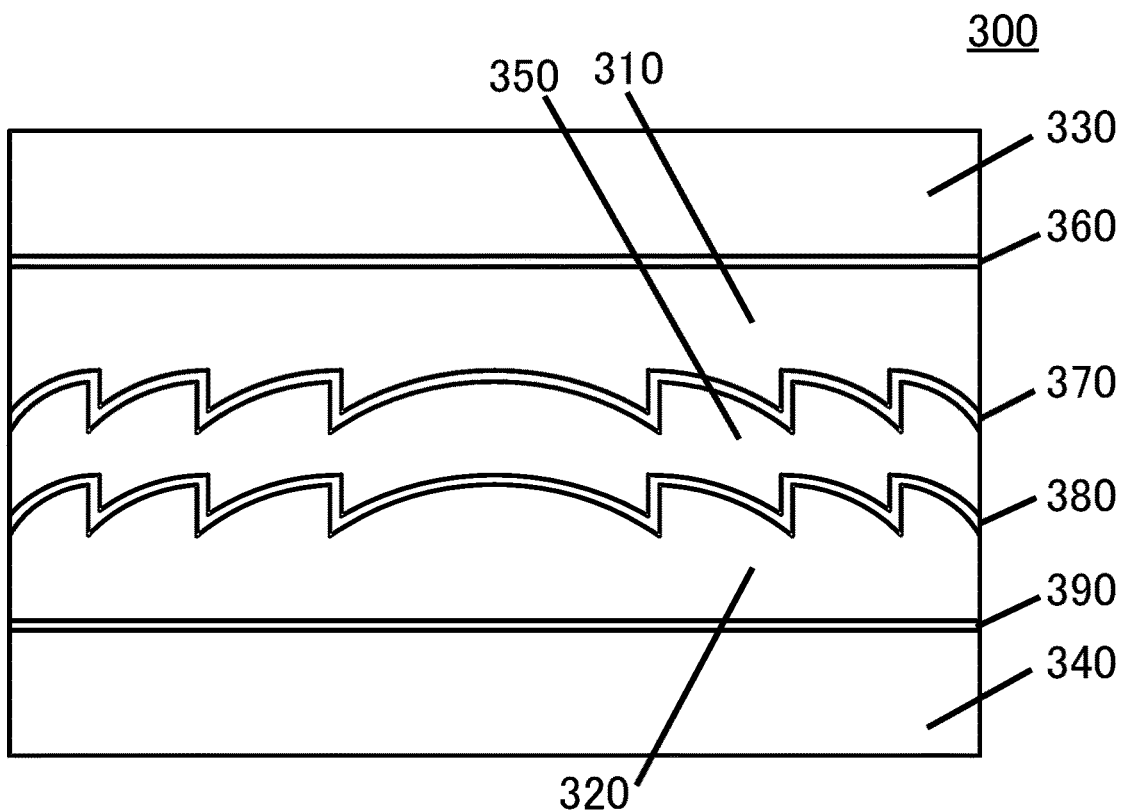
FIG. 7 is a configuration diagram of an optical element as another modification in this embodiment.

Next, referring to FIG. 7, an optical element (electro-active lens or liquid crystal diffraction lens) as another modification in this embodiment will be described. FIG. 7 is a configuration diagram (cross-sectional view) of an optical element (electro-active lens 300) as the modification.

The electro-active lens 300 includes a first electro-active material 310 (first material) having a first refractive index and first Abbe's number and a second electro-active material 320 (second material) having a second refractive index and second Abbe's number. Furthermore, the electro-active lens 300 includes a pair of substrates 330 and 340 provided to sandwich the first electro-active material 310 and the second electro-active material 320 to hold the first electro-active material 310 and the second electro-active material 320. In addition, the electro-active lens 300 includes a substrate 350 provided between the first electro-active material 310 and the second electro-active material 320 to hold the first electro-active material 310 and the second electro-active material 320. In the electro-active lens 300, a surface located closer to the substrate 350 of the surfaces of each of the first electro-active material 310 and the second electro-active material 320 is a relief surface.

The electro-active lens 300 includes optically-transparent electrodes 360, 370, 380, and 390 that are provided close to the first electro-active material 310 or the second electro-active material 320. Each of the optically-transparent electrodes 360, 370, 380, and 390 is constituted by for example ITO. An alignment film may be provided on a surface contacting the corresponding electro-active material of surfaces of each of the electrodes 360, 370, 380, and 390, and according to this configuration, the orientation of the electro-active material can be controlled. The electrodes 360, 370, 380, and 390 apply a predetermined voltage to each of the first electro-active material 310 and the second electro-active material 320 to change the refractive index and the Abbe's number of each of the first electro-active material 310 and the second electro-active material 320 to desired values. The electro-active lens 300 includes the substrate 350 having both surfaces as relief surfaces, and accordingly the relief surfaces can be easily formed.

Figure 11:
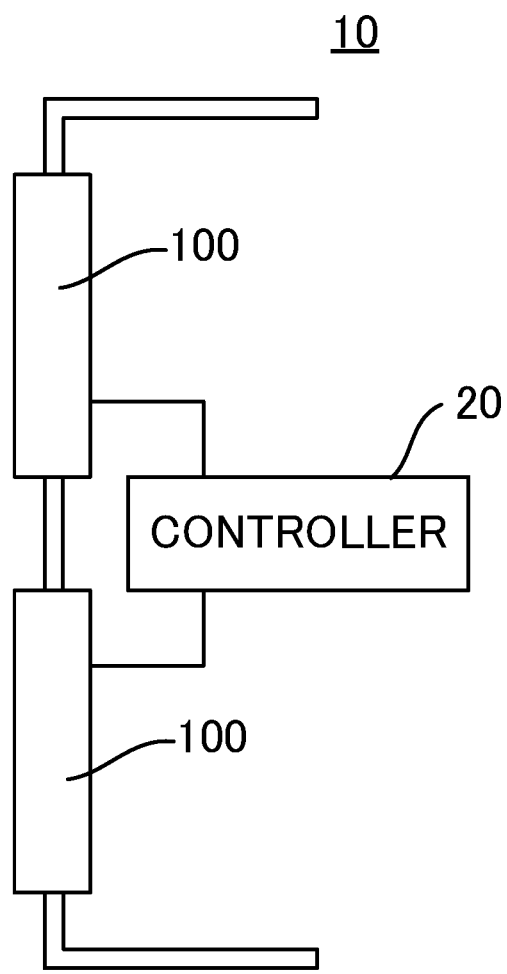
FIG. 11 is a schematic diagram of an optical apparatus in this embodiment.

Next, referring to FIG. 11, an optical apparatus including the optical element (electro-active lens) in this embodiment will be described. FIG. 11 is a schematic diagram of the optical apparatus (glasses 10). As illustrated in FIG. 11, the electro-active lens 100 (or electro-active lens 200 or 300) is used as each of lenses of the glasses 10. A controller 20 controls a voltage that is applied to each of the first electro-active material 110 and the second electro-active material 120 of the electro-active lens 100 so that the electro-active lens 100 can be set to be in the electro-inactive state or the electro-active state.

As described above, the optical element of this embodiment is an electro-active lens that has at least two optical states (optical properties) and it can achieve a high diffraction efficiency over a wide wavelength band even in an electro-active state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the optical element (electro-active lens) can be applied to various optical apparatuses such as binoculars and a head-mounted display, as well as reading glasses.

This application claims the benefit of Japanese Patent Application No. 2015-244490, filed on Dec. 15, 2015, which is hereby incorporated by reference herein in its entirety.

What is claimed is:
1. An optical element switchable to an electro-inactive and an electro-active state, the optical element comprising:
a first material; and
a second material,
wherein each of optical properties of the first and second materials changes between the electro-inactive state and the electro-active state, wherein conditions below are satisfied:

$n1<n2$, and $v1<v2$ where n1 is a refractive index of the first material in the electro-active state, v1 is Abbe's number of the first material in the electro-active state, n2 is a refractive index of the second material in the electro-active state, and v2 is Abbe's number of the second material in the electro-active state, and wherein a condition below is satisfied:

$\Delta n1/\Delta v1 < \Delta n2/\Delta v2$ where Δn1 and Δn2 are respectively variations of the refractive indices of the first and second materials when the electro-inactive state is changed to the electro-active state, and Δv1 and Δv2 are respectively variations of the Abbe's numbers of the first and second materials when the electro-inactive state is changed to the electro-active state.

2. The optical element according to claim 1, wherein:
each of the refractive index of the first material and the Abbe's number of the first material changes between the electro-inactive state and the electro-active state, and
each of the refractive index of the second material and the Abbe's number of the second material changes between the electro-inactive state and the electro-active state.

3. The optical element according to claim 1, wherein at least one of surfaces of each of the first material and the second material is a relief surface.

4. The optical element according to claim 1, wherein the variation Δn1 of the refractive index of the first material, the variation Δn2 of the refractive index of the second material, the variation Δv1 of the Abbe's number of the first material, and the variation Δv2 of the Abbe's number of the second material satisfy a condition below:

$(\Delta n1/\Delta v1)/(\Delta n2/\Delta v2) > 1.5$.

5. The optical element according to claim 1, wherein each of the first and second materials has a birefringence index not less than 0.08.

6. The optical element according to claim 1, wherein in the electro-active state, the refractive index n1 of the first material and the refractive index n2 of the second material satisfy a condition below:

$0.006 < (n2-n1) < 0.06$.

7. The optical element according to claim 1, wherein a difference between the refractive indices of the first and second materials in the electro-inactive state is smaller than a difference between the refractive indices of the first and second materials in the electro-active state.

8. The optical element according to claim 1, wherein a difference between the Abbe's numbers of the first and second materials in the electro-inactive state is smaller than a difference between the Abbe's numbers of the first and second materials in the electro-active state.

9. The optical element according to claim 1, wherein each of the first and second materials is a cholesteric liquid crystal or a nematic liquid crystal including a chiral twist agent.

10. The optical element according to claim 1, further comprising:
a pair of first transparent electrodes provided to sandwich the first and second materials; and
a pair of substrates provided to sandwich the pair of first transparent electrodes.

11. The optical element according to claim 10, wherein a surface located closer to the pair of substrates of surfaces of each of the first and second materials is a relief surface.

12. The optical element according to claim 1, further comprising a second transparent electrode provided between the first and second materials.

13. The optical element according to claim 1, further comprising a substrate provided between the first and second materials,
wherein a surface located closer to the substrate of surfaces of each of the first and second materials is a relief surface.

14. The optical element according to claim 1, wherein the optical element is a liquid crystal diffraction lens having a variable focusing function.

15. An optical apparatus comprising:
the optical element according to claim 1; and
a controller configured to set the optical element to be in the electro-inactive stateor the electro-active state.

16. An optical element switchable to an electro-inactive state and an electro-active state, the optical element comprising:
a first material; and
a second material,
wherein each of optical properties of the first and second materials changes between the electro-inactive state and the electro-active state,
wherein conditions below are satisfied:

$n1<n2$, and $v1<v2$ where n1 is a refractive index of the first material in the electro-active state, v1 is Abbe's number of the first material in the electro-active state, n2 is a refractive index of the second material in the electro-active state, and v2 is Abbe's number of the second material in the electro-active state, and
wherein a difference between the refractive indices of the first and second materials in the electro-inactive state is smaller than a difference between the refractive indices of the first and second materials in the electro-active state.

17. An optical element switchable to an electro-inactive state and an electro-active state, the optical element comprising:
a first material; and
a second material,
wherein each of optical properties of the first and second materials changes between the electro-inactive state and the electro-active state,
wherein conditions below are satisfied:

$n1<n2$, and $v1<v2$ where n1 is a refractive index of the first material in the electro-active state, v1 is Abbe's number of the first material in the electro-active state, n2 is a refractive index of the second material in the electro-active state, and v2 is Abbe's number of the second material in the electro-active state, and
wherein a difference between the Abbe's numbers of the first and second materials in the electro-inactive state is smaller than a difference between the Abbe's numbers of the first and second materials in the electro-active state.

* * * * *